(12) United States Patent
Sugiyama (10) Patent No.: US 8,599,410 B2
(45) Date of Patent: Dec. 3, 2013

(54) PRINT SYSTEM AND PROGRAM FOR RETRANSMITTING PLURAL SETS OF PRINT DATA AND PRINTER FOR RECEIVING THE SAME

(75) Inventor: Takashi Sugiyama, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 835 days.

(21) Appl. No.: 12/722,679

(22) Filed: Mar. 12, 2010

(65) Prior Publication Data

US 2010/0328711 A1    Dec. 30, 2010

(30) Foreign Application Priority Data

Jun. 24, 2009    (JP) .................................. 2009-149921

(51) Int. Cl.
*G06F 3/12* (2006.01)
(52) U.S. Cl.
USPC .......................... 358/1.15; 358/1.14; 358/1.16
(58) Field of Classification Search
None
See application file for complete search history.

(56) References Cited

U.S. PATENT DOCUMENTS

| 7,145,681 | B2 * | 12/2006 | Kato ............................ 358/1.15 |
| 2001/0043723 | A1 * | 11/2001 | Kadota et al. ................. 382/113 |
| 2003/0234958 | A1 * | 12/2003 | Fritz et al. ..................... 358/1.16 |
| 2004/0253981 | A1 * | 12/2004 | Blume et al. ................ 455/552.1 |
| 2005/0024411 | A1 * | 2/2005 | Takenouchi et al. ............ 347/16 |
| 2005/0128505 | A1 * | 6/2005 | Shirai et al. .................. 358/1.16 |
| 2005/0128517 | A1 * | 6/2005 | Sakamoto .................... 358/1.15 |
| 2006/0055796 | A1 * | 3/2006 | Matsui ....................... 348/231.2 |
| 2007/0177190 | A1 * | 8/2007 | Briggs et al. ................. 358/1.15 |
| 2008/0165385 | A1 * | 7/2008 | Kotaka .......................... 358/1.15 |
| 2009/0019114 | A1 * | 1/2009 | Goto et al. .................... 709/205 |

FOREIGN PATENT DOCUMENTS

| JP | 6-297821 A | 10/1994 |
| JP | A-09-311770 | 12/1997 |
| JP | A-2000-301780 | 10/2000 |
| JP | 2006-186598 | 7/2006 |
| JP | 2007-286868 | 11/2007 |
| JP | 2007-334077 A | 12/2007 |

OTHER PUBLICATIONS

Japanese Official Action dated May 10, 2011 together with a partial English language translation from JP 2009-149921.
Japanese Decision of Patent Grant dated Aug. 4, 2011 from related Japanese Application No. 2009-149921, together with an English-language translation.

* cited by examiner

*Primary Examiner* — Twyler Haskins
*Assistant Examiner* — Nicholas Pachol
(74) *Attorney, Agent, or Firm* — Scully, Scott, Murphy & Presser PC (57) ABSTRACT

A print system provided with an information processor and a printer communicably connected to the information processor. The information processor comprises a transmit section for transmitting a plural sets of print data. The printer comprises a receiving section for receiving the print data transmitted from the transmit section; a storage section for storing the print data received by the receiving section; a printing section for printing the print data stored in the storage section; a determination section for determining whether the printing by the printing section is completed or not; and a control section for controlling the printing section not to print the print data transmitted as the second set when the printing of the print data transmitted as the first set is completed, and to print the print data transmitted as the second set when the printing of the print data transmitted as the first set.

11 Claims, 9 Drawing Sheets

<2-1 PRINT SCHEME>

FIG. 6B

<2-4-1-3 PRINT SCHEME>

PRINT SYSTEM AND PROGRAM FOR RETRANSMITTING PLURAL SETS OF PRINT DATA AND PRINTER FOR RECEIVING THE SAME

CROSS REFERENCE TO RELATED APPLICATION

The present application claims priority from Japanese Patent Application No. 2009-149921 filed on Jun. 24, 2009, and the subject matter of which is incorporated herein by reference.

TECHNICAL FIELD

The present invention relates to a print system, a printer, and a program.

BRIEF DESCRIPTION OF RELATED ART

During printing operation, for example, a printing error occurs due to a paper jam in a printer while a sheet conveyed. In this case, even when it is required to resume printing by use of the same print data after elimination of the error, the print data may no longer be stored in the printer.

In order to address the above described problem, there is a related print system provided with a host computer and a printer communicably connected each other. In the related print system, the printer again receives the print data by requesting the host computer to retransmit the print data in a case where the paper jam occurs.

SUMMARY

Incidentally, when a paper jam has occurred in the foregoing related-art print system, the printer must request the host computer to resend print data at all times, which in turn causes a problem of complication of communication processing.

The present invention has been completed under the above described circumstance. The exemplary embodiments of the present invention aim at providing a print system, a printer, and a program that make it possible to resume print processing interrupted due to a print error, such as a paper jam, without requiring a retransmission request.

MEANS FOR SOLVING THE PROBLEM

The first aspect of the exemplary embodiments of the present invention is A print system provided with an information processor and a printer communicably connected to the information processor, wherein
the information processor comprises: a transmit section for transmitting a plural sets of print data the sets including a first set of the print data and a second set of the print data transmitted consecutively to the first set; and the printer comprises: a receiving section for receiving the print data transmitted from the transmit section; a storage section for storing the print data received by the receiving section; a printing section for printing the print data stored in the storage section; a determination section for determining whether the printing by the printing section is completed or not; and a control section for controlling the printing section not to print the print data transmitted as the second set in a case where the determination section determines that the printing section has completed to print the print data transmitted as the first set, and to print the print data transmitted as the second set in a case where the determination section determines that the printing section has failed to print the print data transmitted as the first set.

According to the first aspect of the exemplary embodiments, the information processor transmits a plural sets of print data for transmitting print data responsive to a print request a plurality of times. On the contrary, when a print error does not arise in printing operation based on received print data as the first set, the printer does not perform printing based on print data which have been received as the second set consecutive to the first set. When a print error has arisen, the printer performs printing based on print data which have been received as the second set consecutive to the second set. Consequently, printing interrupted due to a print error can be resumed without requiring from the information processor a retransmission request.

The second aspect of the exemplary embodiments of the present invention is a printer communicably connected to an information processor, comprising: a receiving section for receiving a plurality sets of print data transmitted from the information processor, the sets including a first set of the print data and a second set of the print data transmitted consecutively to the first set; a receiving section for receiving the print data transmitted from the transmit section; a storage section for storing the print data received by the receiving section; a printing section for printing the print data stored in the storage section; a determination section for determining whether the printing by the printing section is completed or not; and a control section for controlling the printing section not to print the print data transmitted as the second set in a case where the determination section determines that the printing section has completed to print the print data transmitted as the first set, and to print the print data transmitted as the second set in a case where the determination section determines that the printing section has failed to print the print data transmitted as the first set.

The third aspect of the exemplary embodiments of the present invention is a program activating a computer of an information processor communicably connected to a printer, comprising: activating the computer to transmit a plural sets of print data to the printer.

According to the exemplary embodiments of the present invention, print processing interrupted due to a print error, such as a paper jam, can be resumed without requesting a retransmission request.

DESCRIPTION OF EXEMPLARY EMBODIMENTS

First Exemplary Embodiment

A first embodiment of the present invention is described by reference to the drawings.

1. Electrical Configuration of a Print System

Figure 1:
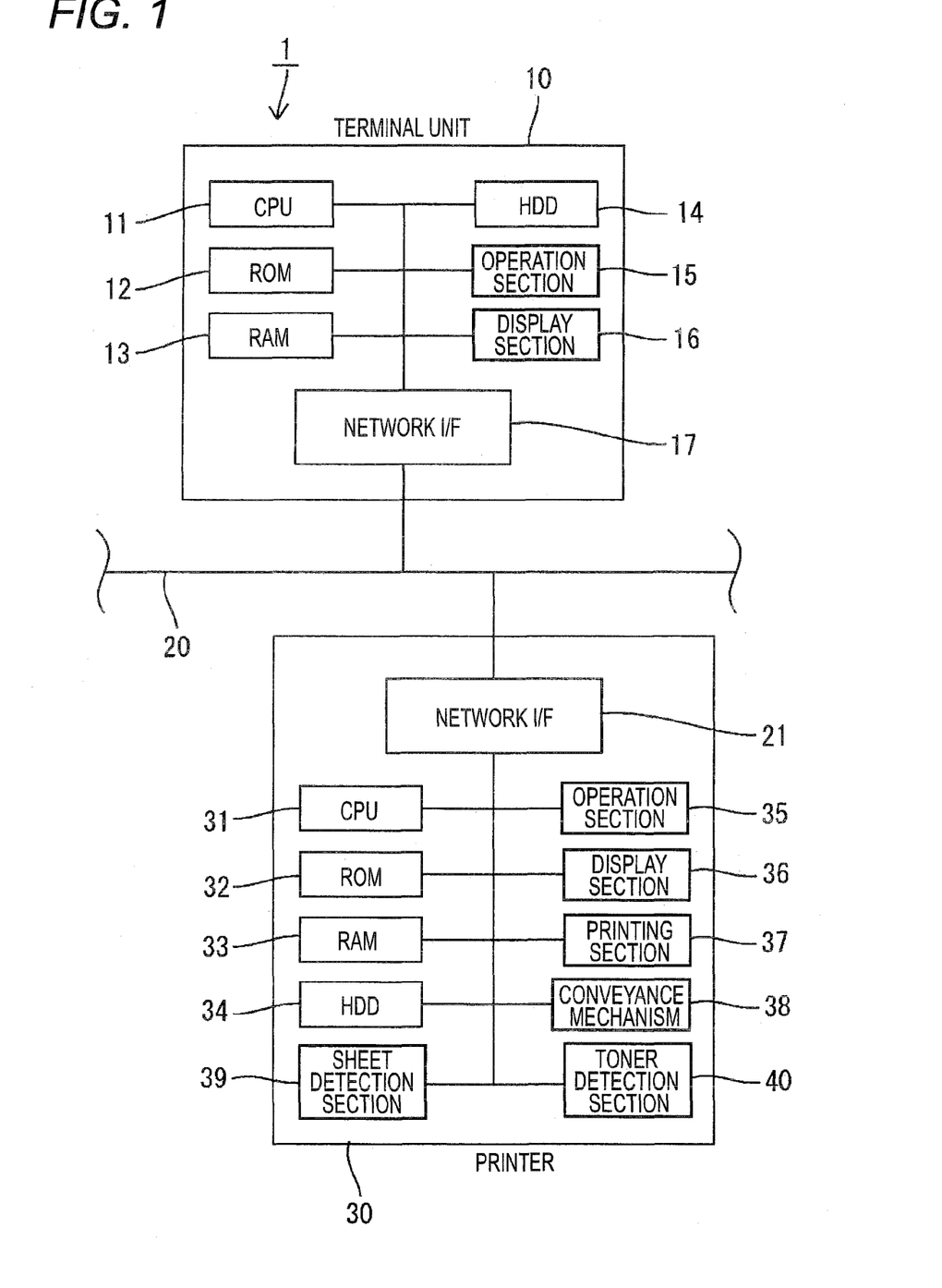
FIG. 1 is a block diagram showing an electrical configuration of a print system of a first embodiment of the present invention.

The print system 1 has a terminal unit 10 (e.g., a personal computer which is an example of an information processing device) and a printer 30 (an example of a printing apparatus).

The terminal unit 10 has a CPU 11, ROM 12, RAM 13, a hard disk drive 14, an operating section 15, a display section 16, a network interface 17, and the like. Examples of the operating section 15 are a keyboard and a pointing device. Example of the display section 16 is a liquid-crystal display. The network interface 17 is connected to a communication line 20. The hard disk drive 14 stores various programs, such as an OS; application software that enables generation of print data; a printer driver for controlling the printer 30; programs for performing transmission processing to be described later; and the like.

The printer 30 has a CPU 31 (an example of a determination section, an example of a control section, and an example of a count section), ROM 32, RAM 33 (an example storage section), a hard disk drive 34, an operation section 35, a display section 36, a printing section 37, a conveyance mechanism 38, a sheet detection section 39, a toner detection section 40, a network interface 21 (an example of a receiving section), and the like. The ROM 32 stores various programs for controlling operation of the printer 30, a double-sided print control program for performing double-sided print processing to be described later, and the like. The CPU 31 controls operation of the printer 30 according to a program read from the ROM 32 while storing a processing result in the RAM 33.

The operation section 35 has a plurality of buttons and enables a user to perform various input operations, such as a print start command. The display section 36 has a liquid-crystal display, a lamp, and the like, and can display various setting screens, operating statuses, and the like. The printing section 37 prints an image based on image data on a sheet W (a sheet, an OHP sheet, and the like). The network interface 21 is connected to the external terminal unit 10, or the like, by way of the communication line 20 and enables mutual data communication. The conveyance mechanism 38, the sheet detection section 39, and the toner detection section 40 will be described later.

2. Internal Configuration of a Printer

In the following descriptions, when constituent elements are distinguished from each other on a per-color basis, reference numerals given to the elements are assigned subscripts; namely, Y (yellow), M (magenta), C (cyan), and B (black). When the constituent elements are not distinguished from each other, subscripts are omitted.

Figure 2:
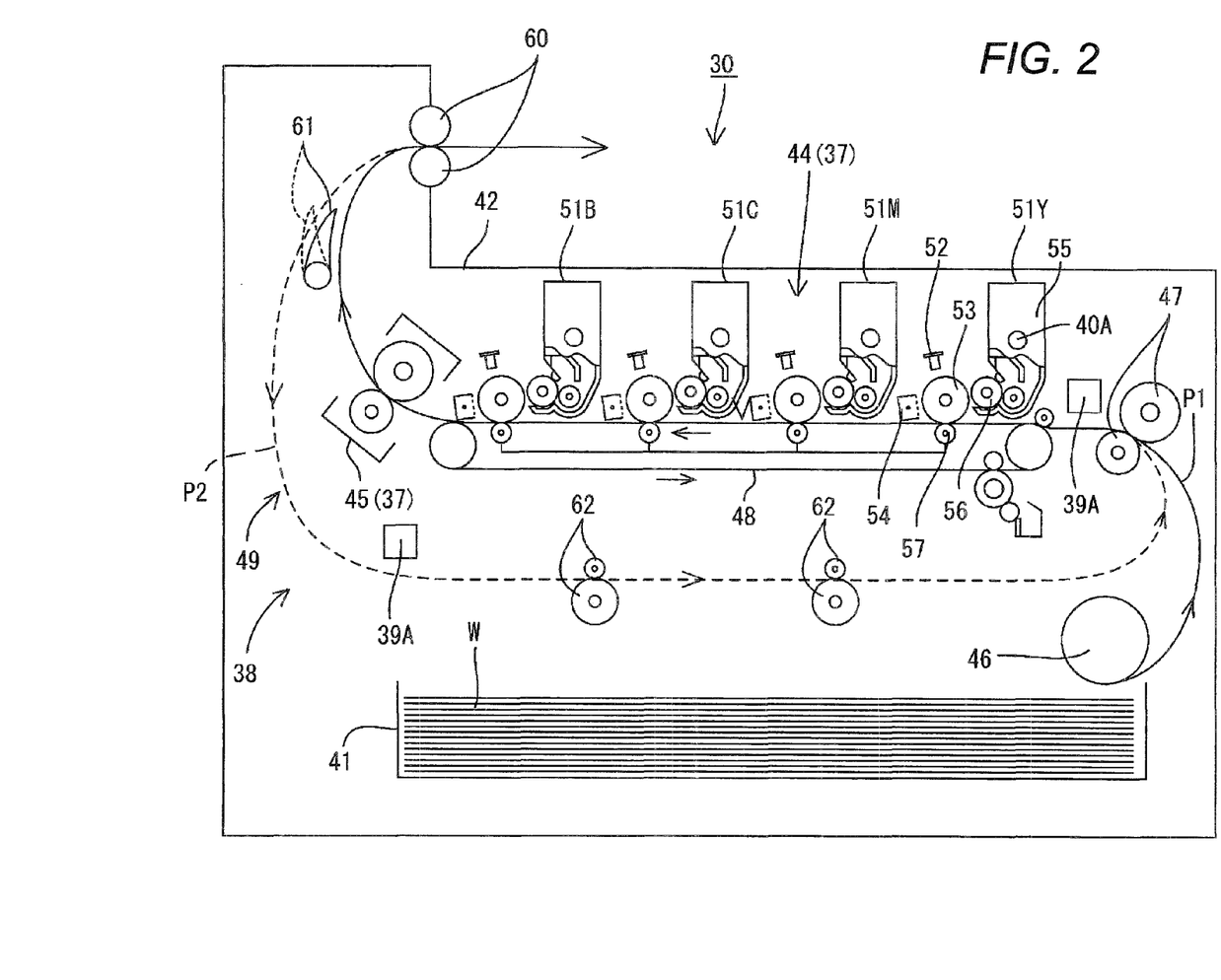
FIG. 2 is a schematic view showing an internal configuration of a printer.

The printer 30 has a feed tray 41, the aforementioned printing section 37, the conveyance mechanism 38, an output tray 42, and the like. The feed tray 41 is provided in a bottom of the printer 30 and can store a plurality of sheets W.

The printing section 37 has a process section 44, a fixing unit 45, and the like. The conveyance mechanism 38 has a pickup roller 46, registration rollers 47 and 47, a sheet conveyance belt 48, an inversion mechanism 49, and the like. The pickup roller 46 draws out sheets W housed in the feed tray 41 one at a time and conveys the thus-drawn sheet to the registration rollers 47 and 47. The registration rollers 47 and 47 align the position of the thus-conveyed sheet W aligned and sends the sheet onto the belt 48 at predetermined timing.

The process section 44 has a plurality of (e.g., four) process cartridges 51Y, 51M, 51C, and 51B and a plurality of (e.g., four) exposure units 52 corresponding to a plurality of (e.g., four) colors of toner, respectively. Each of the process cartridges 51 has a photosensitive member 53, an electrifier 54, a toner housing section 55, and the like. A position on the belt 48 located immediately below the process section 44 is hereinafter called a "print position."

The electrifier 54 is a so-called scorotoron electrifier and uniformly electrifies a surface of the corresponding photosensitive member 53. The exposure unit 52 has a plurality of light-emitting elements (e.g., LEDs) arranged in a line along a direction of a rotary shaft of the corresponding photosensitive member 53. The plurality of light-emitting elements are controlled so as to illuminate in accordance with respective colors of image data, whereby electrostatic latent images are formed on surfaces of the respective photosensitive elements 53.

The toner housing section 55 stores an individual color of toner (e.g., positively charged, nonmagnetic single-component toner in the present embodiment) and a development roller 56. The development roller 56 positively electrifies toner (with positive polarity) and supplies toner in the form of a uniform thin layer on the corresponding photosensitive member 53, thereby developing the electrostatic latent image to form a toner image (a monochrome image or a color image).

Each of transfer rollers 57 is placed at a position where the belt 48 is sandwiched between the transfer roller 57 and the corresponding photosensitive member 53. A transfer voltage whose polarity is opposite to electrostatic polarity of the toner is applied to the position between the transfer roller 57 and its corresponding photosensitive member 53, whereby the toner image formed on the photosensitive member 53 is transferred to the sheet W.

Subsequently, the sheet W is conveyed to the fixing unit 45 by means of the conveyance mechanism 38. The toner image is thermally fixed by the fixing unit 45, and the sheet is conveyed toward the output tray 42. A path (an arrow of solid line shown in FIG. 2) for guiding the sheet W delivered from the feed tray 41 to the print position on the belt 48 is called a print conveyance path P1.

The inversion mechanism 49 includes output rollers 60, an inversion conveyance path P2 (an arrow of a dotted line in FIG. 2), a flapper 61, a plurality of inversion conveyance rollers 62, and the like. When double-sided printing is performed, an image is formed on a back (an undersurface of the sheet when the sheet is stored in the feed tray 41; namely, an example single side) of the sheet W by means of the process section 44, and the sheet is subsequently, temporarily conveyed to the output roller 60.

By means of reverse rotation of the output roller 60, the sheet W is conveyed onto the belt 48 by way of the flapper 61, the inversion conveyance path P2, the plurality of inversion conveyance rollers 62, and the registration rollers 47 while turned inside out. After an image has been printed on a front side of the sheet W (an upper surface of the sheet achieved when the sheet is housed in the feed tray 41) by means of the process section 44, the sheet W is output onto the output tray 42.

The sheet detection section 39 has a plurality of sensors 39A, and each of the sensors 39A outputs a detection signal corresponding to presence/absence of the sheet W at a conveyance position in the conveyance mechanism 38. When continually received a detection signal representing presence of the sheet W for a specified period of time or longer from each of the sensors 39A or when not continually received the signal for the specified period of time or longer, the CPU 31 determines that a paper jam (a sheet jam) occurred at any of the conveyance positions. In the embodiment, one or the plurality of sensors 39A is provided along the print conveyance path P1 and the inversion conveyance path P2, as shown in FIG. 2, Hence, the CPU 31 can also determine which one of the print conveyance path P1 and the inversion conveyance path P2 has undergone occurrence of a jam.

The toner detection section 40 individually detects a quantity of toner remaining in the toner housing section 55 in each of the process cartridges 51. Specifically, light transmission windows are provided on respective right and left sidewalls of each of the process cartridges 51. The toner detection section 40 has four sensors 40A assigned respectively to the four process cartridges 51.

Each of the sensors 40A has a light emitting element and a light receiving element disposed opposite each other such that both sides of the light transmission window of the process cartridge 51 are sandwiched between the light emitting element and the light receiving element. Light from the light emitting element passes through the transmission windows, to thus be received by the light receiving element. A quantity of light received by the light receiving element varies according to a quantity of toner remaining in the toner housing section 55. Therefore, the toner detection section 40 provides the CPU 31 with a received light signal commensurate with a quantity of light received by each of the light receiving elements, so that the CPU 31 can separately ascertain the quantity of toner remaining in each of the process cartridges 51.

3. Double-Sided Print Processing Scheme

Figure 3A:
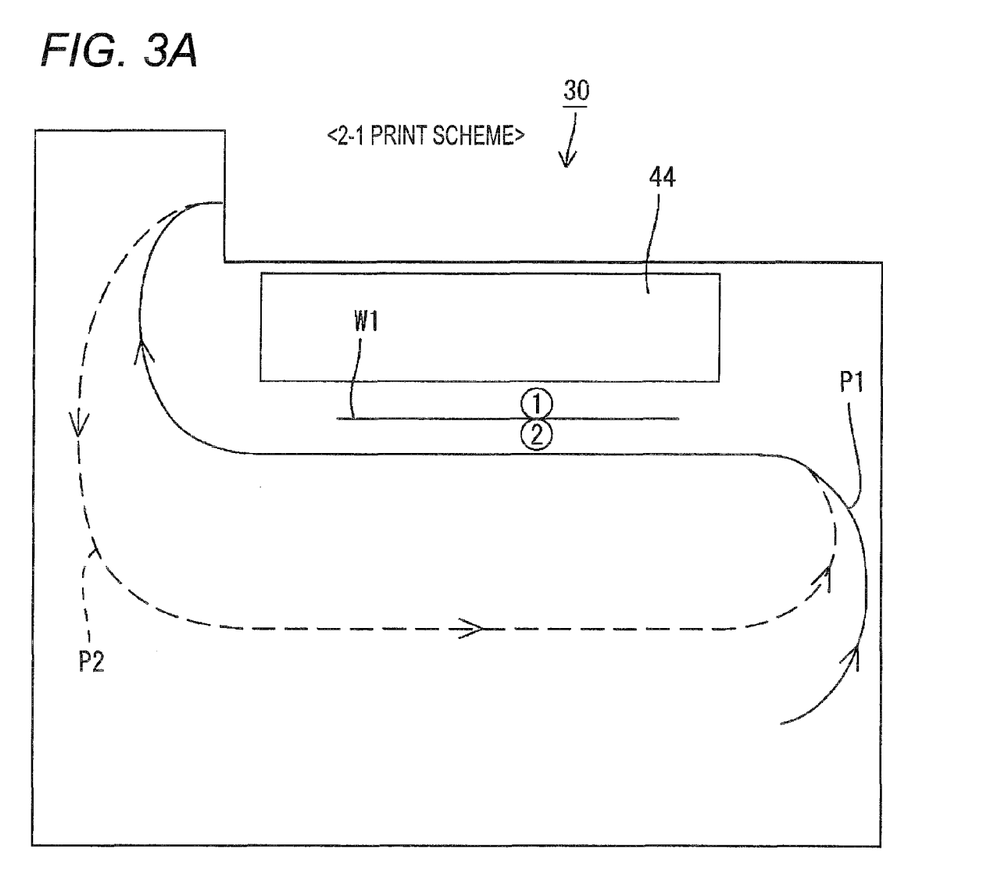
FIG. 3A is a schematic view for describing a double-sided 2-1 print scheme.
Figure 3B:
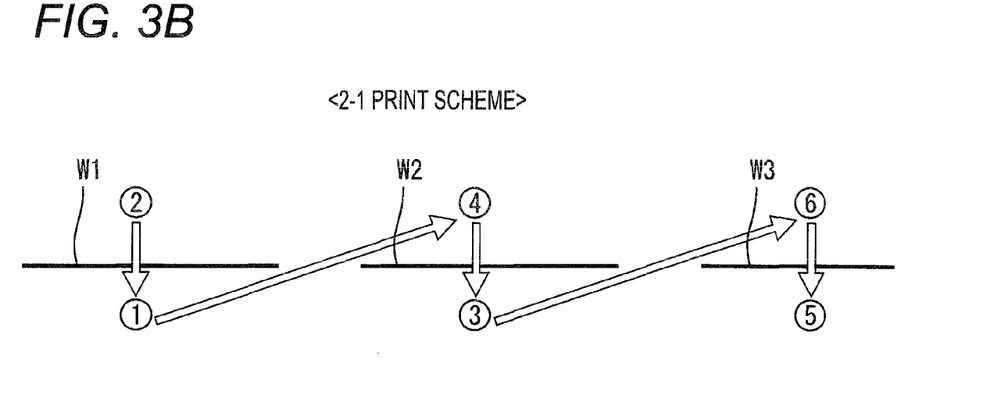
FIG. 3B is a view for describing a printing sequence of the double-sided 2-1 print scheme.
Figure 4A:
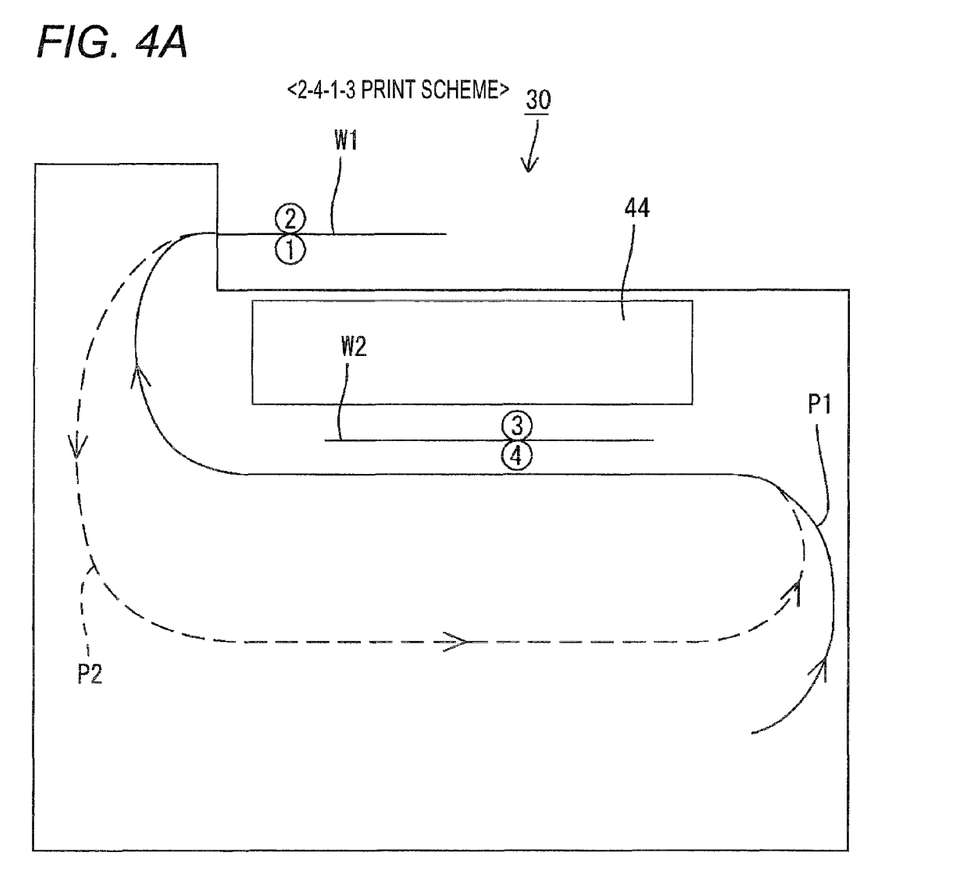
FIG. 4A is a schematic view for describing a double-sided 2-4-1-3 print scheme.
Figure 4B:
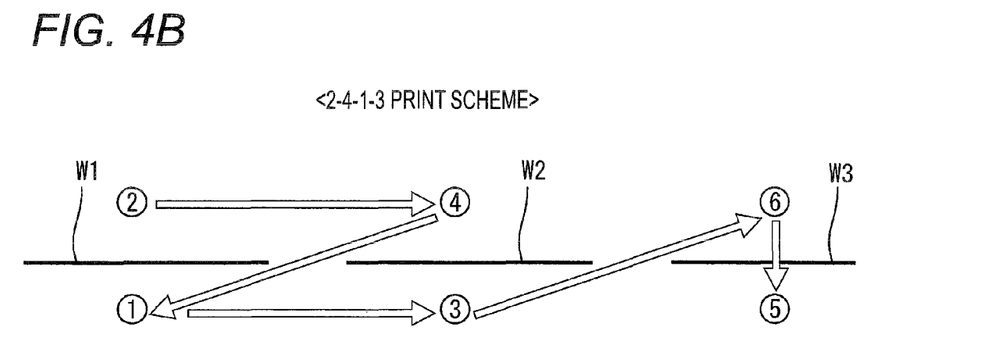
FIG. 4B is a view for describing a printing sequence of the double-sided 2-4-1-3 print scheme.

FIGS. 3A and 4A are schematic diagrams for describing respective double-sided print processing schemes, FIGS. 3B and 4B are for describing print sequences of the respective schemes. In the drawings, marks of encircled numbers are assigned to the sheets W. The marks of numbers represent images of respective pages, and the numbers represent page numbers. Positions of the marks on the respective sheets W represent sides (front or back sides) of the respective sheets W on which the images of the respective pages are formed. Outlined arrows and reference numerals in FIGS. 3B and 4B represent a print sequence.

After having printed images on back sides of N (N is an integer of one or more) nonprint sheets (the sheet W whose both sides are not subjected to printing), the printer 30 can perform double-sided printing including operation for printing images on M (M is equal to or less than N) front sides of backside printed sheets (sheets W only back sides of which are subjected to printing).

The N sheets are hereinafter called "backside prints N," and the M sheets are hereunder called "front-side prints M." The printer 30 can selectively carry out double-sided printing of a plurality of schemes that differ from each other in terms of at least either the backside prints N and the front-side prints M. All of the plurality of schemes are finite loop systems and classified according to the magnitude of the number of backside prints N. The term "finite loop system" means a scheme for iterating operation (finite loops) for subjecting front sides of the sheets W equal in number to the backside prints N to printing after having subjected back sides of the sheets W equal in number to backside prints N to printing. Every time one finite loop is completed, a back-printed sheet becomes extinct. Example schemes are hereinafter described.

A print scheme where the number of backside prints N is one: a 2-1 scheme

A print scheme where the number of backside prints N is two: a 2-4-1-3 scheme

A print scheme where the number of backside prints N is three: a 2-4-6-1-3-5 scheme The 2-1 scheme is a finite loop system that has assumes a number of one for the number of backside prints N and a number of one for the number of front-side prints M and that corresponds to a scheme for consecutively performing back printing of one sheet W and front printing of the same sheet from start to finish of printing (i.e., a consecutive double-sided print scheme). For instance, when images for six pages are printed on three sheets W by means of double-sided printing, the printer 30 performs printing in the following sequence (see FIG. 3B).

An image for the second page (on the back side of the first sheet W1)

An image for the first page (on the front side of the first sheet W1)

An image for the fourth page (on the back side of the second sheet W2)

An image for the third page (on the front side of the second sheet W2)

An image for the sixth page (on the back side of the third sheet W3)

An image for the fifth page (on the front side of the third sheet W3)

As shown in FIG. 3A, after the image for the second page has been printed on the back side of the first sheet W1, the second sheet W and subsequent sheets W are not subjected to printing before the image for the first page is printed on the front side of the sheet W1. Accordingly, the 2-1 scheme has a low potential of production of an incomplete sheet but provides low print processing speed.

The "2-4-1-3 scheme" is a finite loop system that involves a value of two for the number of backside prints N and a value of two for the number of front-side prints M and that iterates operation for subjecting front sides of two sheets W to printing after having subjected the back sides of the same to printing. For instance, when images for six pages are printed on three sheets W by means of double-sided printing, the printer 30 performs printing in the following sequence (see FIG. 4B).

An image for the second page (on the back side of the first sheet W1)

An image for the fourth page (on the back side of the second sheet W2)

An image for the first page (on the front side of the first sheet W1)

An image for the third page (on the front side of the second sheet W2)

An image for the sixth page (on the back side of the third sheet W3)

An image for the fifth page (on the front side of the third sheet W3)

As shown in FIG. 4A, the image for the sixth page is not printed on the back side of the third sheet W3 before the image for the third page is printed on the front side of the second sheet W2. Accordingly, the 2-4-1-3 scheme has a higher potential of production of an incomplete sheet than does the 2-1 print scheme when compared with the 2-1 scheme but provides faster print processing speed than that provided by the 2-1 print scheme.

4. Print Control Processing

Print control processing performed by the print system 1 is now described separately in connection with processing performed by the terminal unit 10 and processing performed by the printer 30.

4-1. Processing Performed by the Terminal Unit

When the user inputs a print request by launching application software for handling a document, an image, and the like, with the operation section 15, the CPU 11 reads the printer driver from the hard disk drive 14 and displays a print setting screen (not shown) on the display section 16 for specifying print conditions, such as setting of image quality, a monochrome/color image, single/double sided printing, a double sided print scheme, and the like.

When the user sets the print conditions on the print setting screen and performs predetermined determination operation, the terminal unit 10 transmits to the printer 30 print data (e.g., PDL data or bitmap data) corresponding to one print request (a print job), and various pieces of print setting information set on the print setting screen.

The following descriptions are assumed to be based on presumptions provided below. The present invention is also applicable to cases that do not fulfill the presumptions.

A. The terminal unit 10 serially transmits image data, which pertains to respective pages and is included in the print data, not in sequence of pages but in sequence equal to a printing sequence of the printer 30. Accordingly, the printer 30 can print image data pertaining to respective pages from the terminal unit 10 on the sheets W in sequence of receipt without re-arranging the image data.

B. A memory area for storing received print data is assured in the RAM 33 of the printer 30. For instance, only high picture quality color image data (e.g., bitmap data) for one page can be stored in the memory area. Accordingly, the printer 30 cannot basically receive image data pertaining to the next page after received one page of image data from the terminal unit 10 and after completion of processing for printing one page of image data on the sheet W.

Figure 5:
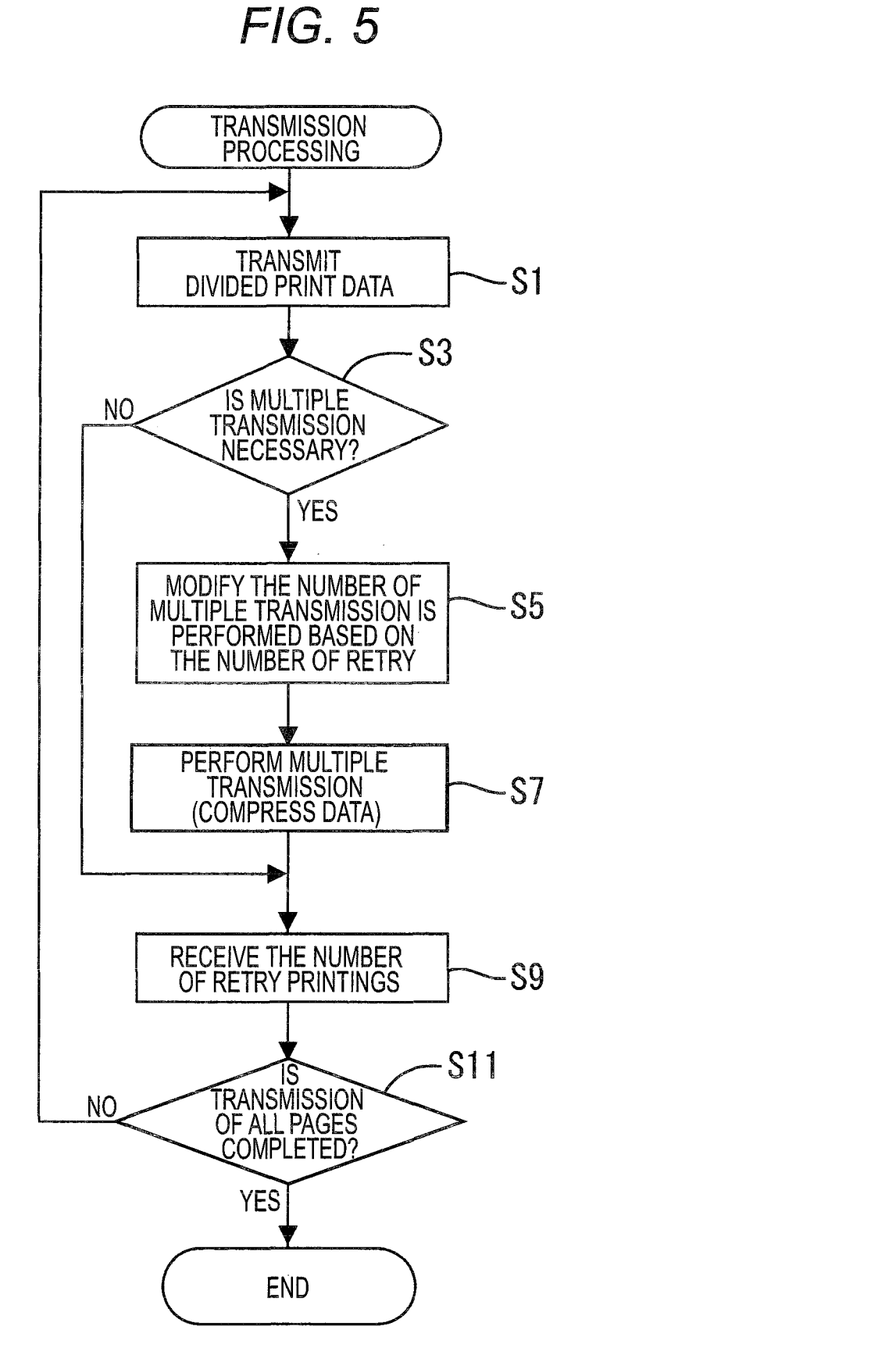
FIG. 5 is a view showing a flowchart of transmission processing of the first embodiment.

FIG. 5 is a view showing a flowchart of transmission processing. When double-sided printing is specified on the print setting screen, the CPU 11 performs transmission processing, whereby the terminal unit 10 performs multiple transmission for serially transmitting print data corresponding to a single print request to the printer 30 more than once. In particular, in the present embodiment, multiple transmission is carried out for each of units of division of the print data. The multiple transmission is a transmission performed by the transmit section so as to transmit a plural sets of print data. The multiple transmission is specifically described below.

The CPU 11 acquires one data unit of the print data (hereinafter called "divided print data") among the print data from the application and transmits the thus-acquired divided print data to the printer 30 by the network interface 17 (S1). The CPU 11 and the network interface 17 act as a "transmission section" at this time.

The data unit means a unit of division for the print data and corresponds to an amount of data including image data to be printed on at least one sheet W. The image data to be printed on one sheet W correspond to image data to be printed on a single side for the case of single-sided printing and image data to be printed on front and back sides for the case of double-sided printing. Moreover, when allocation printing for printing a plurality of images on one sheet W is utilized during single-sided printing and double-sided printing, the image data are image data commensurate with the number of allocations.

Further, in the present embodiment, the data unit varies according to a double-sided print scheme to be designated. Specifically, the data unit corresponds to an amount of image data equivalent to one finite loop in each of the schemes. In the case of, for instance, the 2-1 print scheme, the data unit corresponds to a set of image data to be printed on the front and back sides of one sheet W. In the case of the 2-4-1-3 print scheme, the data unit corresponds to two sets of image data to be respectively printed on the front and back sides of two sets of sheets W.

From a characteristic of single divided print data [e.g., a single-sided printing/double-sided printing purpose, a resolution (image quality), and the number of colors], the CPU 11 then determines whether to perform multiple transmission (S3). Specifically, the CPU 11 acquires the characteristic of the single divided print data in accordance with the print setting information. The CPU 11 acts as a "characteristic acquisition section" at this time.

When the thus-acquired characteristic does not correspond to any of the characteristics such as a single-sided printing purpose, a monochrome image, and low image quality (hereinafter called "light weight characteristics"), the multiple transmission is determined to be necessary. When the acquired characteristic corresponds to at least any one of the characteristics, the multiple transmission is determined to be unnecessary. The reason for making determinations as mentioned above is as follows.

As mentioned above, the printer 30 can store only one page of color image data in the memory area. Meanwhile, the single divided print data include image data equivalent to at least one sheet (or double sides). Therefore, when the characteristic of the single divided print data is; for instance, a double-sided printing purpose and high resolution or a color image, an amount of data may surpass a specific amount (the capacity of the memory area), and there is a high possibility of a failure to simultaneously store the entirety of single divided print data in the memory area.

This means that the image data received during the first half of the receiving processing for the single divided print data are deleted from the memory area when the print error of failure to normally finish the printing (e.g., toner empty, a sheet jam, and the like) occurs during the printing of the image data received in the latter half of the receiving processing for the single divided print data. In such a case, the printer 30 cannot resume double-sided printing of the single divided print data without again receiving the single divided print data subjected to a print error from the terminal unit 10. Specifically, in such a case, the multiple transmission becomes necessary.

Meanwhile, when the characteristic of the single divided print data corresponds to at least any of the light weight characteristics, the amount of data becomes equal to or smaller than the specified amount, and there arises a high possibility of the ability to simultaneously store the entirety of the single divided print data into the memory area. In such a case, the entirety of the single divided print data can be left in the memory area before processing for printing the single divided print data is completed. Therefore, even when a print error occurred, double-sided printing of the single divided print data can be resumed. Namely, multiple transmission is not necessary.

When determined that multiple transmission be necessary (YES in S3), the CPU 11 determines the number of multiple transmission operations (hereinafter called a "multiple transmission operation count") as the number of operations changed according to the number of retry printings (S5). Specifically, the larger the number of retry printings, the larger the multiple transmission operation count. The number of retry printings designates the number of times the printer 30 has performed printing (retry printing) on the basis of the print data provided through multiple transmission in response to occurrence of the print error in the printer 30. The terminal unit 10 receives, as necessary, the number of retry printings from the printer 30.

The CPU 11 performs multiple transmission the number of times equal to the multiple transmission count has been carried out (S7). For instance, when the multiple transmission operation count has been performed is three, data (hereinafter called "multiple divided print data") identical with the single divided print data already transmitted in S1 (hereinafter called "first divided print data") are serially transmitted three times. In this case, the printer 30 receives the single divided print data four times in total. The divided print data are additionally provided with identification information used for determining whether the divided print data are the first divided print data or the multiple divided print data.

The CPU 11 transmits the multiple divided print data to the printer 30 at a compression rate higher than that used for compressing the first divided print data. For instance, only the multiple divided print data are compressed and transmitted without compression of the first divided print data. Although the first divided print data are always used for printing, the multiple divided print data are used only when a print error has arisen. Accordingly, an attempt is made to lessen communication load by transmitting the multiple divided print data at a higher compression rate.

After the multiple transmission, the latest number of times retry printing has been performed is received from the printer 30 (S9). Timing when the number of times retry printing is performed is received may also be; for instance, a transmission processing start time, or the number of retry printings may also be received only when multiple transmission is determined to be necessary.

In the meantime, when multiple transmission is determined to be unnecessary (NO in S3), the multiple divided print data are not transmitted to the printer 30, and processing proceeds to S9. The number of times retry printing has been performed is received from the printer 30 (S9). If there are image data pertaining to an untransmitted page in connection with the print data corresponding to the single print request (NO in S11), processing returns to S1 in relation to the print data responsive to the first print request. If transmission of image data pertaining to all pages is completed (YES in S11), transmission processing will end.

Figure 6A:
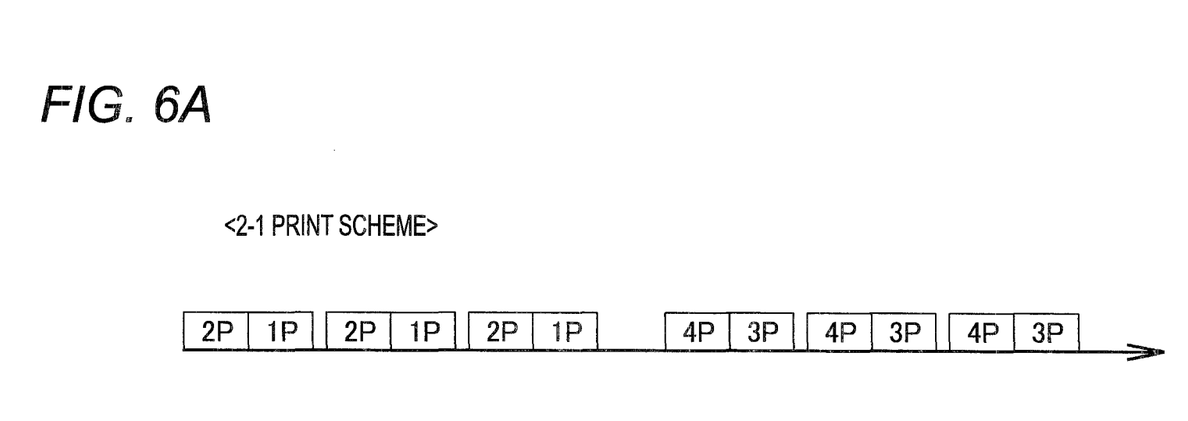
FIG. 6A is a view illustrating a transmission sequence of divided print data according to the respective double-sided print schemes.
Figure 6B:
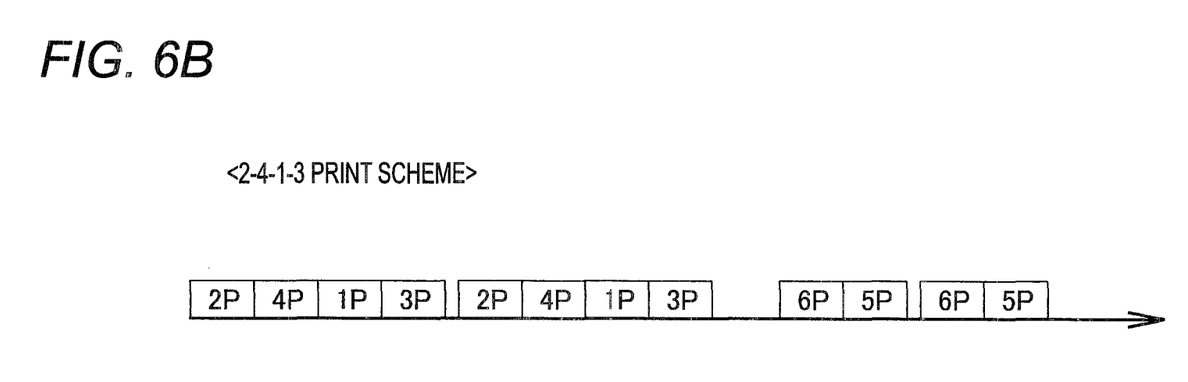
FIG. 6B is a view illustrating the transmission sequence of divided print data according to the respective double-sided print schemes.

By means of transmission processing, the terminal unit 10 performs multiple transmission of the print data corresponding to the single print request in units of division. FIG. 6 is a view exemplifying a sequence of transmission of divided print data conforming to each of the double-sided print schemes. Reference symbol "*P" indicates image data pertaining to an individual page.

FIG. 6A shows a case where double-sided printing of the 2-1 print scheme is performed in connection with print data including four pages of image data. The multiple transmission is determined to be necessary in connection with the data unit of a top (including image data pertaining the first and second pages) and the data unit of the next sequence (including image data pertaining to the fourth and third pages). Multiple divided print data are transmitted the number of times equal to the latest number of times retry printing is performed (twice).

FIG. 6B is a case where the 2-4-1-3 double-sided print scheme is performed in connection with print data including six pages of image data. The multiple transmission is determined to be necessary in connection with the data unit of a top (including image data pertaining the second, fourth, first, and third pages) and the data unit of the next sequence (including image data pertaining to the six and fifth pages). The multiple divided print data are transmitted the number of times equal to the latest number of times retry printing is performed (once).

4-2. Processing of the Printer

When received the print request from the terminal unit 10, the CPU 31 of the printer 30 analyzes the print setting information so as to determine which one of one-sided printing and double-sided printing is designated. When single-sided printing is designated, the CPU causes the printing section 37 to subject one side of an unprinted sheet to single-sided printing. Meanwhile, when double-sided printing is designated, the CPU 31 performs double-sided print processing to be described next.

Figure 7:
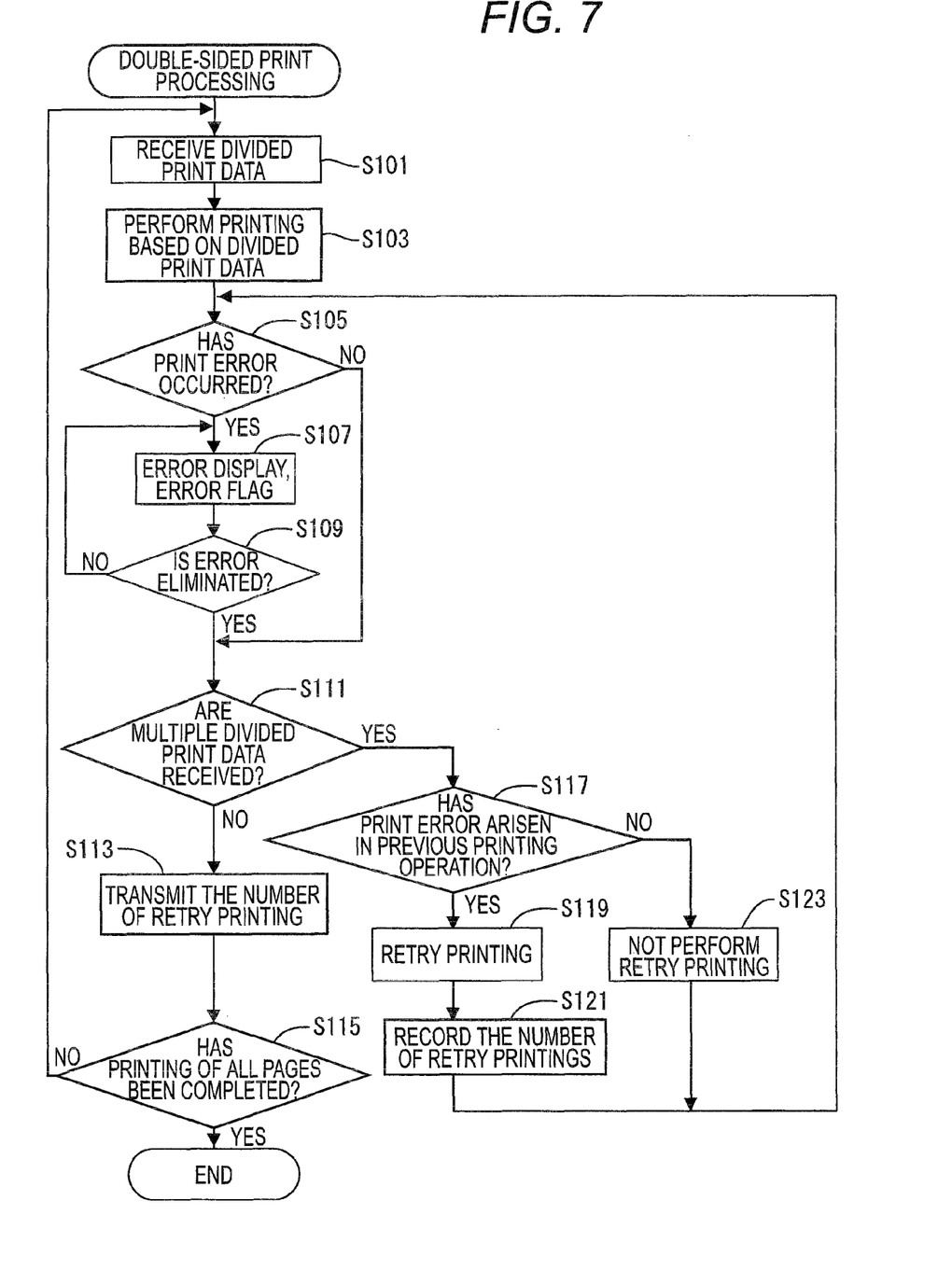
FIG. 7 is a view showing a flowchart of double-sided print processing of the first embodiment.

FIG. 7 is a view showing a flowchart of double-sided print processing. The printer 30 performs double-sided print processing according to the process flow and is able to resume printing operation interrupted due to a print error without requiring a retransmission request. Specific explanations are provided below.

First, the CPU 31 receives the first divided print data from the printer 30 (S101) and determines whether or not a print error has occurred (S105) while controlling the printing section 37 so as to carry out printing on the basis of the divided print data (S103). The CPU 31 acts as a "determination section" at this time.

Specifically, the CPU 31 determines whether or not a sheet jam error has arisen, in accordance with the detection signal from the sheet detection section 39. The CPU 31 also determines whether or not there has occurred a toner deficiency error representing that an amount of toner remaining in each of the process cartridges 51 is less than a specified amount, in accordance with a received light signal from the toner detection section 40. When at least one of the sheet jam error and the toner deficiency error is determined to have arisen, the print error is determined to have occurred.

When determined that the print error occurred (YES in S105), the CPU 31 causes the display section 36 to display a message, a drawing, or the like, showing occurrence of a print error and sets an error flag in; for instance, the RAM 33 (S107). The display makes it possible for the user to ascertain occurrence of the print error, and the user performs operation for eliminating the print error (elimination of the jammed sheet W or replacement of the process cartridge 51).

When the print error is determined to be eliminated in accordance with, for instance, the detection signal and the received light signal (YES in S109), processing proceeds to S111. Meanwhile, when the print error is determined not to have arisen (NO in S105), processing proceeds to S111.

The CPU 31 determines whether or not the multiple divided print data have been received (S111). Specifically, in accordance with the identification information added to newly-received divided print data, it is determined whether or not the received divided print data are the multiple divided print data.

When the terminal unit 10 determines that multiple transmission is necessary (YES in S3 shown in FIG. 5), the printer 30 receives multiple divided print data, and hence the CPU 31 determines to receive the multiple divided print data (YES in S111). In this case, it is determined whether or not a print error has arisen during printing of the previously-received divided print data (S117). The determination is made on the basis of a result of a determination as to whether or not the error flag is set in the RAM 33.

When the print error is determined to have arisen (YES in S117), the printing section 37 is controlled so as to perform printing (retry printing) in accordance with the multiple divided print data received this time (S119). The update number of times retry printing is performed, which is achieved by adding one to the number of times retry printing is performed, is recorded in, for instance, the RAM 33 (S121) and the processing returns to S105. The CPU 31 acts as a "count section" at this time.

When the print error is determined not to have occurred (NO in S117), the multiple divided print data received this time are skipped, and processing returns to S105 without performing retry printing of the multiple divided print data received this time (S123). The CPU 31 acts as a "count section" this time.

In the meantime, for instance, when waited for a given period of time and determined that the multiple divided print data are not received (NO in S111), the CPU 31 transmits the latest number of times retry printing is performed to the terminal unit 10 (S113). Data representing completion of transmission of divided print data equivalent to one data unit may be transmitted from the terminal unit 10 to the printer 30 in; for instance, a period between S7 and S9 shown in FIG. 5, and the printer 30 may also determine not to receive multiple divided print data by receipt of the data in S11 shown in FIG. 11. When print data corresponding to the single print request include image data pertaining to an unprinted page (NO in S115), processing returns to S101. In contrast, when printing of all pages of the image data is completed (YES in S115), double-sided print processing ends.

5. Advantage of the Embodiment

According to the present embodiment, the terminal unit 10 performs multiple transmission for transmitting, a plurality of times, the print data corresponding to the single print request. On the contrary, when a print error has not occurred during printing of received print data, the printer 30 doe not perform printing based on print data which will be received a next time or a subsequent time. When a print error has occurred, printing (retry printing) based on print data which will be received in a next time or a subsequent time. Accordingly, printing operation interrupted as a result of occurrence of a print error can be resumed without requiring from the terminal unit 10 a retransmission request.

Further, multiple transmission of the print data is performed in units of division. Even when the print data include images to be printed on a plurality of sheets, printing interrupted as a result of occurrence of a print error can be resumed in units of division.

The multiple transmission operation count is performed is changed according to the number of times retry printing has been performed (the number of times a print error has arisen). Therefore, the duplex transmission operation count can be determined as an appropriate number of times corresponding to the frequency of occurrence of a print error.

Second Exemplary Embodiment

Figure 8:
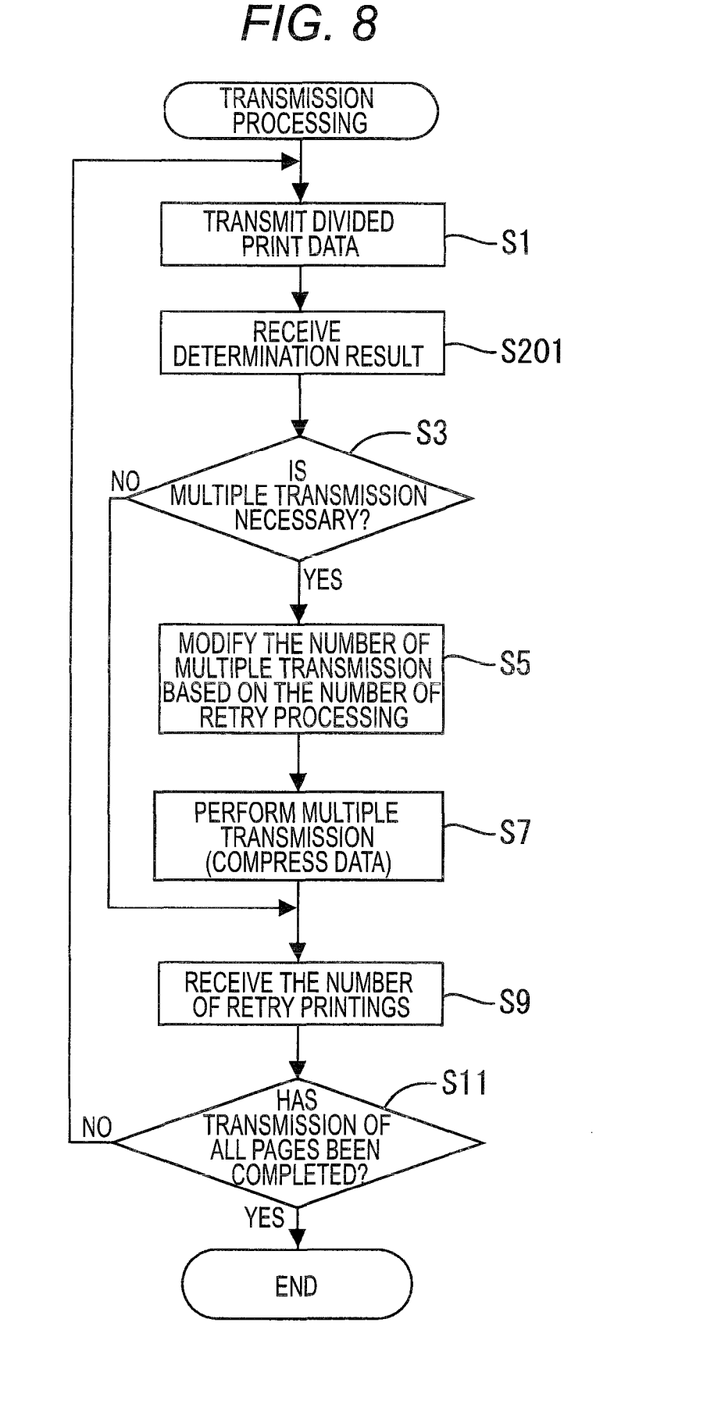
FIG. 8 is a view showing a flowchart of transmission processing of a second embodiment.
Figure 9:
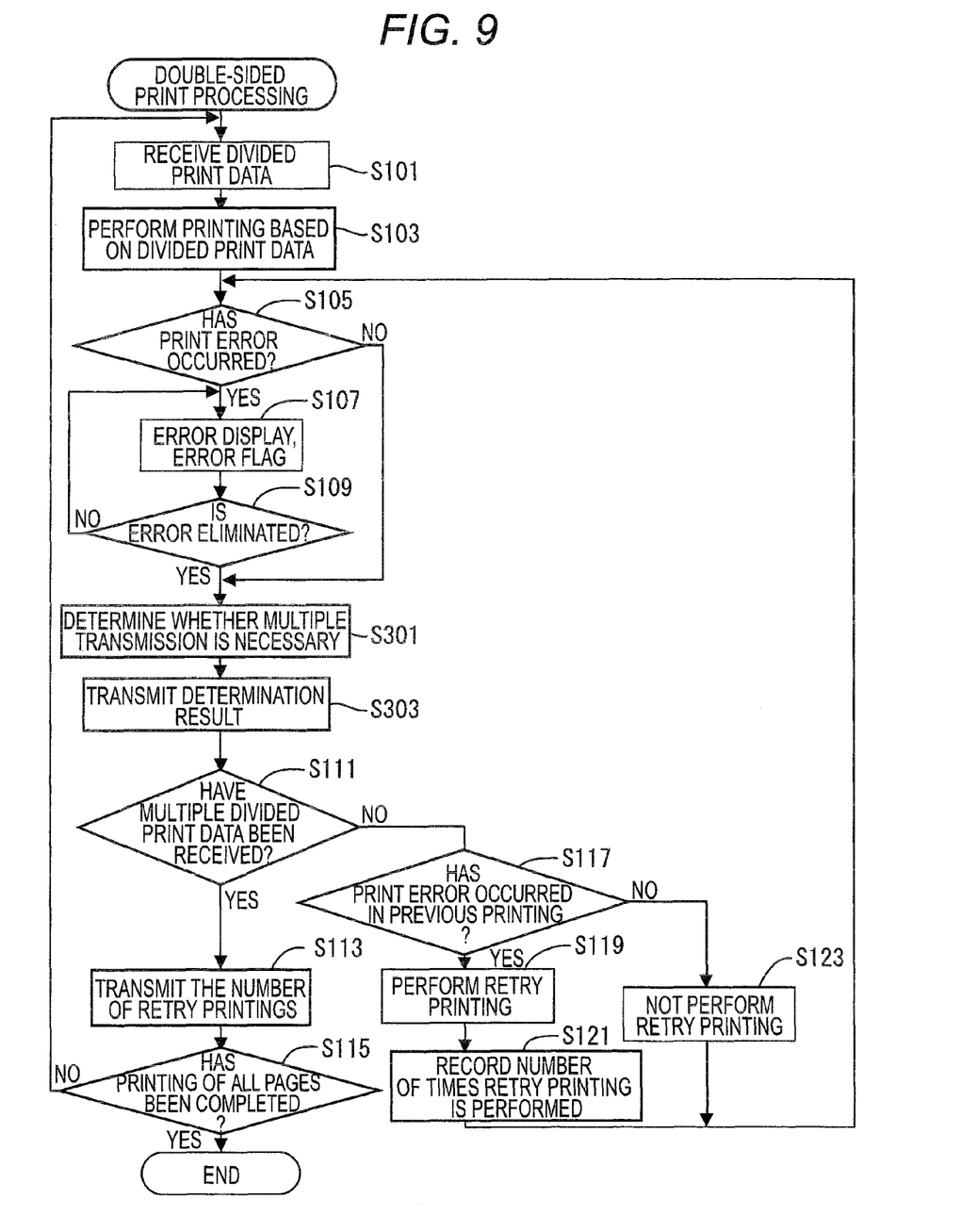
FIG. 9 is a view showing a flowchart of double-sided print processing of the second embodiment.

FIGS. 8 and 9 show a second embodiment. A difference between the first embodiment and the second embodiment lies in a method for determining whether multiple transmission is necessary. In other respects, the present embodiment is analogous to the first embodiment. Therefore, reference numerals identical with those described in connection with the first embodiment are assigned to similar operations, and their repeated explanations are omitted. Explanations are given solely to the difference.

In the embodiment, the printer 30 determines a necessity (possibility of) for multiple transmission on the basis of a state of load on memory of the printer (a free memory space and the degree of use of memory of the printer 30) and transmits a determination result to the terminal unit 10.

FIG. 8 is a drawing showing a flowchart of transmission processing. FIG. 9 is a view showing a flowchart of double-sided print processing. Processing operations substantially identical with the transmission processing operation shown in FIGS. 5 and 7 are assigned the same reference numerals, and their overlapping descriptions are omitted. As shown in FIG. 9, when the print error is determined to have been eliminated (YES in S109), the CPU 31 of the printer 30 determines a necessity for multiple transmission, in accordance with the state of load on the printer 30 (S301).

Specifically, the CPU 31 makes a determination as to at least one of the following items (1) and (2).

(1) When the free space of the RAM 33 is less than the amount of high quality color image data equivalent to the one data unit, multiple transmission is determined to be necessary. When the free space is equal to or greater than the amount of data, multiple transmission is determined to be unnecessary. When the printer 30 has a function other than the print function, such as a copy function, a scanner function, and a facsimile function, the free space changes according to whether or not the other function uses the space. Accordingly, the CPU 31 ascertains the free space of the RAM 33 and compares the thus-ascertained free space with a predetermined threshold value, thereby determining whether or not multiple transmission is necessary. The CPU 31 functions as a "memory space ascertaining section." A determination about a necessity for multiple transmission may also be made without ascertaining a free space and merely on the basis of whether or not the other function is used.

(2) When a degree to which an external device uses the printer 30 is less than a reference level, multiple transmission is determined to be necessary (possible). When the degree is equal to or greater than the reference level, multiple transmission is determined to be unnecessary (impossible). For instance, in a case where the plurality of terminal units 10 are connected to the printer 30 in a communicable manner, if multiple transmission of the one terminal unit 10 is admitted, a state in which a print request from another terminal unit 10 is refused by the printer 30 will continue during the period of multiple transmission. Accordingly, the CPU 31 determines the degree of use in accordance with the state of communication of a communication port of the network interface 21 (e.g., the number of accesses) and also determines a necessity for multiple transmission in accordance with a result of determination. The CPU 31 functions as a "use determination section" at this time.

The CPU 31 transmits a result of determination about a necessity for multiple transmission to the terminal unit 10 (S303), and processing proceeds to S111.

Meanwhile, the terminal unit 10 receives the determination result (S201 in FIG. 8). When multiple transmission is determined to be necessary (YES in S3), processing proceeds to S5. When multiple transmission is determined to be unnecessary (NO in S3), processing proceeds to S9.

Even in such a configuration, printing interrupted as a result of occurrence of a print error can be resumed without requiring from the terminal unit 10 a retransmission request.

Further, it is also possible to determine a necessity of performance of multiple transmission according to the state of load on the printer 30.

Additional Modifications

The present invention is not limited to the embodiment described by reference to the descriptions and drawings. For instance, the following various modes also fall within a technical scope of the present invention. In particular, constituent elements other than constituent elements of the highest-level invention, among the constituent elements of the embodiment, are additional elements and hence can be omitted as necessary.

(1) In each of the embodiments, the LED printer 30 is mentioned as an example image forming apparatus. However, the present invention is not limited to the LED printer. The image forming apparatus may also be of a polygon mirror type or another electrophotographic type. Moreover, the image forming apparatus may also be of an inkjet type. The image forming apparatus can also be a color printer other than the four-color printer or a single-color (e.g., a monochromatic) printer.

(2) Each of the embodiments has been described by means of taking a sheet jam error and a toner empty error as example print errors. However, the present invention is not limited to these errors. For instance, the print error may also be an error resultant from deterioration of the photosensitive member 53 or a print preparation delay error caused when print preparation, such as receipt and expansion of print data, is not yet completed despite arrival of the sheet W at the print position on the printing section 37.

(3) The respective embodiments have provided explanations about the example in which the user performs settings, such as a print request and print conditions, on the terminal unit 10. However, the present invention is not limited to the example. For instance, print data may also be stored in the hard disk drive 34 of the printer 30 or external memory, and the user may perform double-sided print processing by sending a request for executing double-sided printing of the print data, and the like, by way of the operation section 35.

(4) The respective embodiments have provided explanations by taking double-sided printing of the finite loop system as an example. However, the present invention is not limited to the printing but may also apply to double-sided print processing of an infinite loop system. The term "infinite loop system" is a system for subjecting back sides of the sheets W equal in number to the backside prints N to printing and subsequently inserting printing of a backside of a new, unprinted sheet in the middle of front sides of the sheets W equal in number to the backside prints N undergoing printing. The sheets having finished undergoing backside printing are incessantly present except start and end times of double-sided print processing. Therefore, the infinite loop system provides faster print processing speed than that provided by the finite loop system. However, there is a high potential of generation of an incomplete sheet having a print solely on its backside because of a print error. For instance, a 2-4-1-6-3-5 print scheme and a 2-4-6-1-8-3-5-7-9 print scheme are infinite loop systems. When eight pages of image data are printed by means of double-sided printing in conformance to the 2-4-1-6-3-5 print scheme and when the multiple transmission operation count is one, transmission is performed in sequence of (2P•4P•1P) [2P•4P•1P], (6P•3P) [4P•6P•3P•], (8P•5P) [6P•8P•5P], (7P) [8P•7P]. The reference symbol "*P" designates each page of image data. Reference symbol ( ) designates initial divided print data, and [ ] designates multiple divided print data. Initial divided print data are data acquired by dividing print data corresponding to single print request every time a sequence of print of front side image data is attained; in other words, data acquired by dividing into a plurality of units of division such that front side print data comes to the end of print sequence. Multiple divided print data are data that are acquired by adding, to the initial divided print data, backside image data that are the last in print sequence with respect to immediately preceding divided print data.

(5) The respective embodiments have mentioned, as an example, the printer 30 capable of storing one page of high image quality color data in the memory area. The printer may also be one having equivalent storage capacity or more. Even in the case of such a printer, when the capacity of the memory area is smaller than an amount of print data or an amount of data equal in size to one data unit, double-sided printing of the print data interrupted by occurrence of a print error can be resumed by application of the present invention without requiring from the terminal unit a retransmission request.

(6) In the first embodiment, it is determined, from characteristics of single divided print data, whether or not multiple transmission needs to be performed; namely, whether the number of times multiple transmission is performed is set to zero or one (whether the number of times single divided print data are transmitted is set to one or two). The present invention is not limited to zero and one. The number of times multiple transmission is performed may also be changed to numbers other than zero and one in accordance with characteristics.

(7) In the first embodiment, it is determined whether or not multiple transmission is necessary, according to the light weight characteristic of the single divided print data. However, the present invention is not limited to the way to make a determination. For instance, the amount of single divided print data may also be directly ascertained, and it may be determined whether or not multiple transmission is necessary, according to a comparison between the amount of data and a specified amount.

(8) In the respective embodiments, the number of times multiple transmission is performed is made greater with an increase in the number of times retry is performed. However, the present invention is not limited to the configuration. There may also be adopted; for instance, a configuration in which, when the number of times retry is performed exceeds a marginal number of times, the number of times multiple transmission is performed is reduced as compared with that achieved immediately before the marginal number of times is exceeded in order to avoid unnecessary multiple transmission.

(9) In the respective embodiments, only multiple divided print data are compressed and transmitted without compression of initial divided print data. However, the present invention is not limited to the transmission. For instance, since the initial divided print data and a plurality of immediately following sets of divided print data are used with high probability, the data are not compressed, and only the other subsequent divided print data may be compressed. In short, any configuration is acceptable, so long as print data to be subsequently transmitted by means of multiple transmission are transmitted at a compression rate higher than that used for transmitting print data to be previously transmitted.

(10) In place of or in addition to the configurations described in connection with the first and second embodiments, there may also be adopted a configuration in which, the terminal unit 10 ascertains a state of load (a state of network load) on the communication line 20 in accordance with a packet communication traffic volume in the communication line 20 of the print system 1 and in which, when the state of load is high, multiple transmission is determined to be impossible. On the contrary, when the state of load is low, multiple transmission is determined to be possible.

(11) In the second embodiment, it is determined, from the state of load on the memory of the printer 30, whether or not multiple transmission needs to be performed; namely, whether or not the number of times multiple transmission is performed is set to zero or one (whether the number of times single divided print data are transmitted is set to one or two). However, the present invention is not limited to two levels. For instance, the state of load may be divided into three or more levels, and the multiple transmission operation count may also be changed according to which one of the levels applies to the state of load.

The exemplary embodiments described above have at least following aspects and corresponding advantages. These aspects and advantages can be suitably combined to fog to additional modifications.

One aspect of the exemplary embodiments of the present invention is that the print data is divided into a plurality of data units including a first image unit and a second image unit, the image unit includes at least an image to be printed on one sheet, the transmit section transmits a plurality sets of the first data unit, and the transmit section transmits a plurality sets of the second data unit.

According to the aspect, even when the print data include images to be printed on a plurality of sheets, printing interrupted due to a print error can be resumed in the set of data unit.

Another aspect of the exemplary embodiments of the present invention is that the print data includes a plurality sets of image data, each set of image data is to be printed on a corresponding page, and the transmit section transmits the sets of image data in a same order where the printing section print the sets of image data in a case where a double-sided printing is required.

According to the aspect, since respective pages of image data included in the print data are transmitted in the same order where the printer prints the data. Therefore, as compared to a case where the print data is transmitted in an order different from that of printing, the configuration makes it possible to resume printing interrupted due to a print error in a comparatively easy manner.

Another aspect of the exemplary embodiments of the present invention is that the print system comprises a counter section for counting the number of times where the printing section have failed to print the print data, wherein the transmit section modifies the number of the multiple transmissions for the print data based on the number of the negative determination.

According to the aspect, it is possible to appropriately determine the number of times print data are transmitted according to the number of times a print error has occurred (the number of times an affirmative determination has been made).

Another aspect of the exemplary embodiments is that a characteristic acquisition section for acquiring a characteristics of the print data, wherein the transmit section modifies the number of the sets of the print data based on the characteristics.

For instance, so long as the amount of print data is small and so long as a majority of the print data can be stored in the storage section, it is possible to resume printing interrupted due to a print error by reducing the number of the sets of the print data or by storing the print data in the storage section until printing is normally completed even when only one set of the print data is transmitted. A size of the print data is ascertained from the amount of data or presumed from double-sided printing/single-sided printing, the number of colors of an image, an image quality level, and the like. Accordingly, in the aspect, the number of times print data are transmitted is changed in accordance with characteristics of the print data (the amount of data, double-sided printing/single-sided printing, the number of colors of an image, an image quality level, and the like).

Another aspect of the exemplary embodiments of the present invention is that the print system comprises a storage capacity check section for checking a storage capacity of the storage section, wherein the transmit section modifies the number of the sets of the print data based on the storage capacity of the storage section.

For instance, so long as the storage capacity of the storage section is large and so long as the majority of print data can be stored in the storage section, printing interrupted due to a print error can be resumed by reducing the number of the sets of the print data or storing the print data in the storage section until the printing is normally completed even when only one set of the print data is transmitted. Accordingly, the number of sets of the print data is changed according to the storage capacity.

Another aspect of the exemplary embodiments of the present invention is that the print system comprises a use determination section for determining a frequency in use of the printing section, wherein the higher the frequency in use of the printing section is, the smaller the number of the sets of the print data transmitted by the transmit section.

For instance, it is not preferable to transmit a large number set of the print data when the frequency in use of the printer is high. Accordingly, in this aspect, the number of the sets of the print data is reduced as the frequency in use increases.

Another aspect of the exemplary embodiment of the present invention is that a storage capacity of the storage section is smaller than a data amount of one set of the print data transmitted by the transmit section.

This aspect is particularly effective for a case where storage capacity is smaller than the data amount of one set of the print data.

Another aspect of the exemplary embodiments is that the print data transmitted as the second set is compressed higher than the print data transmitted as the first set.

There is a high possibility of the print data transmitted as the first set being used for printing, whilst the print data to be later transmitted are not used so long as a print error does not arise. According to this aspect, it is possible to lessen communication load by highly compressing the print data to be transmitted later.

The invention claimed is:

1. A print system provided with an information processor and a printer communicably connected to the information processor,
wherein the information processor comprises:
a first processor; and
a first storage device having computer-readable instructions that, when executed by the first processor, cause the first processor to operate as:
a transmitting section configured to transmit a plural sets of print data in response to a printing instruction, the sets including a first set of the print data and a second set of the print data transmitted consecutively to the first set, the first set of the print data being identical with the second set of the print data; and the printer comprises:
- a second processor; and
- a second storage device having computer-readable instructions that, when executed by the second processor, cause the second processor to operate as:
- a receiving section configured to receive both the first set of the print data and the second set of the print data transmitted from the transmitting section;
- a storage controlling section configured to store in a storage section at least the first set of the print data received by the receiving section;
- a printing controlling section configured to instruct a printing section to print at least the first set of the print data stored in the storage section;
- a determination section configured to determine whether the printing by the printing section is completed or not;
- a storage capacity check section for checking a storage capacity of the storage section; and
- the printing controlling section further configured to instruct the printing section not to print the received second set of the print data in a case where the determination section determines that the printing section has completed to print the first set of the print data, and to print the received second set of the print data in a case where the determination section determines that the printing section has failed to print the first set of the print data,
- wherein the transmitting section modifies a number of the sets of the print data based on the storage capacity of the storage section.

2. The print system according to claim 1, wherein the print data is divided into a plurality of data units including a first data unit and a second data unit, the data unit includes at least an image to be printed on one sheet, the transmitting section transmits a plurality sets of the first data unit, and the transmitting section transmits a plurality sets of the second data unit consecutively.

3. The print system according to claim 1, wherein the print data includes a plurality sets of image data, each set of image data is to be printed on a corresponding page, and the transmitting section transmits the sets of image data in a same order where the printing section print the sets of image data in a case where a double-sided printing is required.

4. The print system according to claim 1, wherein the second storage device further has computer-readable instructions that, when executed by the second processor, cause the second processor to further operate as:
- a counter section for counting the number of times where the printing section have failed to print the print data, wherein
- the transmitting section further modifies the number of the sets of the print data based on the number of times where the printing section have failed to print the print data.

5. The print system according to claim 1, wherein the first storage device further has computer-readable instructions that, when executed by the first processor, cause the first processor to further operate as:
- a characteristic acquisition section for acquiring a characteristics of the print data, wherein
- the transmitting section further modifies the number of the sets of the print data based on the characteristics.

6. The print system according to claim 1 wherein the second storage device further has computer-readable instructions that, when executed by the second processor, cause the second processor to further operate as:
- a use determination section for determining a frequency in use of the printing section, wherein
- the higher the frequency in use of the printing section is, the smaller the number of the sets of the print data transmitted by the transmitting section.

7. The print system according to claim 1, wherein a storage capacity of the storage section is smaller than a data amount of one set of the print data transmitted by the transmitting section.

8. The print system according to claim 1, wherein the second set of the print data is compressed higher than the first set of the print data.

9. A printer communicably connected to an information processor, comprising:
- a processor; and
- a storage device having computer-readable instructions that, when executed by the processor, cause the processor to operate as:
- a receiving section configured to receive a plural sets of print data transmitted from the information processor in response to a printing instruction, the sets including a first set of the print data and a second set of the print data transmitted consecutively to the first set, the first set of the print data being identical to the second set of the print data;
- a storage controlling section configured to store in a storage section at least the first set of the print data received by the receiving section;
- a printing controlling section configured to instruct a printing section to print at least the first set of the print data stored in the storage section;
- a determination section configured to determine whether the printing by the printing section is completed or not;
- a storage capacity check section for checking a storage capacity of the storage section; and
- the printing controlling section configured to instruct the printing section not to print the received second set of the print data in a case where the determination section determines that the printing section has completed to print the first set of the print data, and to print the received second set of the print data in a case where the determination section determines that the printing section has failed to print the first set of the print data, wherein a number of the sets of the print data received is based on the storage capacity of the storage section.

10. A non-transitory computer-readable medium storing instructions for causing a processor to execute the method comprising:
- determining if one or more second set of print data is to be transmitted to a printer based on a preset criterion;
- transmitting, in response to a printing instruction, a first set of the print data and the one or more second set of the print data to the printer before a subsequent transmission of additional set of the print data, the one or more second set of the print data transmitted consecutively to the first set, the first set of print data being identical with the one or more second set of the print data, wherein a number of sets of the print data transmitted is determined based on a storage capacity of a storage section of the printer.

11. The non-transitory computer-readable medium according to claim 10, wherein the one or more second set of the print data is determined to be transmitted after a transmission of the first set of the print data.

* * * * *